United States Patent
Zhou et al.

(10) Patent No.: US 9,619,794 B2
(45) Date of Patent: Apr. 11, 2017

(54) SYSTEMS AND METHODS FOR PROVIDING COMPENSATION, REBATE, CASHBACK, AND REWARD FOR USING MOBILE AND WEARABLE PAYMENT SERVICES, DIGITAL CURRENCY, NFC TOUCH PAYMENTS, MOBILE DIGITAL CARD BARCODE PAYMENTS, AND MULTIMEDIA HAPTIC CAPTURE BUYING

(71) Applicants: Tiger T G Zhou, Tiburon, CA (US); Andrew H B Zhou, San Gabriel, CA (US); Dylan T X Zhou, Tiburon, CA (US)

(72) Inventors: Tiger T G Zhou, Tiburon, CA (US); Andrew H B Zhou, San Gabriel, CA (US); Dylan T X Zhou, Tiburon, CA (US)

( * ) Notice: Subject to any disclaimer, the term of this patent is extended or adjusted under 35 U.S.C. 154(b) by 0 days.

(21) Appl. No.: 15/061,982

(22) Filed: Mar. 4, 2016

(65) Prior Publication Data

US 2016/0189137 A1    Jun. 30, 2016

Related U.S. Application Data

(63) Continuation-in-part of application No. 13/185,491, filed on Jul. 18, 2011, now Pat. No. 9,367,841, and a
(Continued)

(51) Int. Cl.
*G06Q 30/02* (2012.01)
*G06Q 20/38* (2012.01)
(Continued)

(52) U.S. Cl.
CPC ....... *G06Q 20/3274* (2013.01); *G06K 7/1095* (2013.01); *G06K 19/06112* (2013.01);
(Continued)

(58) Field of Classification Search
CPC ............. G06Q 20/3274; G06Q 20/385; G06Q 20/3278; G06Q 20/3223; G06Q 20/387;
(Continued)

(56) References Cited

U.S. PATENT DOCUMENTS

| | | | | |
|---|---|---|---|---|
| 5,918,213 A | * | 6/1999 | Bernard | G06Q 20/12 705/26.35 |
| 9,100,493 B1 | * | 8/2015 | Zhou | H04M 1/72522 |

(Continued)

*Primary Examiner* — Daniel Walsh
(74) *Attorney, Agent, or Firm* — Steven A. Nielsen; www.NielsenPatents.com

(57) ABSTRACT

Provided are methods and systems for providing compensation for using a mobile payment service. The method may commence with receiving payment information associated with a user. The method may include generating a unique code encoding the payment information and providing the generated unique code to the user. The method may continue with receiving a deposit amount associated with a purchase related to the user. The purchase may be made via the mobile payment service. The method may further include receiving a notification about a further purchase of the user via the mobile payment service. The notification may include at least the unique code and a product barcode. The product barcode may be associated with the further purchase. The method may further include providing a compensation from the deposit amount to the user. The compensation may be associated with a payment amount associated with the further purchase.

19 Claims, 12 Drawing Sheets

Related U.S. Application Data continuation-in-part of application No. 14/815,988, filed on Aug. 1, 2015, now Pat. No. 9,342,829, which is a continuation-in-part of application No. 13/760,214, filed on Feb. 6, 2013, now Pat. No. 9,016,565, which is a continuation-in-part of application No. 13/623,944, filed on Sep. 21, 2012, which is a continuation-in-part of application No. 13/620,775, filed on Sep. 15, 2012, now abandoned, which is a continuation-in-part of application No. 13/343,044, filed on Jan. 4, 2012, now abandoned, which is a continuation-in-part of application No. 13/287,279, filed on Nov. 2, 2011, now abandoned, which is a continuation-in-part of application No. 12/749,412, filed on Mar. 29, 2010, now abandoned.

(60) Provisional application No. 60/415,546, filed on Oct. 1, 2002.

(51) Int. Cl.

| | | |
|---|---|---|
| *G06Q 20/40* | (2012.01) | |
| *G06Q 20/34* | (2012.01) | |
| *G06Q 30/06* | (2012.01) | |
| *G06Q 20/32* | (2012.01) | |
| *G06K 7/10* | (2006.01) | |
| *G06K 19/06* | (2006.01) | |

(52) U.S. Cl.
CPC .......... *G06Q 20/32* (2013.01); *G06Q 20/322* (2013.01); *G06Q 20/3223* (2013.01); *G06Q 20/3276* (2013.01); *G06Q 20/3278* (2013.01); *G06Q 20/34* (2013.01); *G06Q 20/385* (2013.01); *G06Q 20/387* (2013.01); *G06Q 20/401* (2013.01); *G06Q 20/405* (2013.01); *G06Q 20/40145* (2013.01); *G06Q 30/0208* (2013.01); *G06Q 30/0222* (2013.01); *G06Q 30/0234* (2013.01); *G06Q 30/0236* (2013.01); *G06Q 30/0239* (2013.01); *G06Q 30/0267* (2013.01); *G06Q 30/06* (2013.01); *G06Q 30/0601* (2013.01); *G06Q 30/0641* (2013.01)

(58) Field of Classification Search
CPC ...... G06Q 20/34; G06Q 20/405; G06Q 20/32; G06Q 20/401; G06Q 30/0234; G06Q 30/0222; G06Q 30/0208; G06Q 30/0236; G06Q 30/0239; G06Q 30/06; G06Q 30/0601; G06Q 30/0641; G06Q 30/0267; G06K 7/1095; G06K 19/06112
See application file for complete search history.

(56) References Cited

U.S. PATENT DOCUMENTS

| | | | |
|---|---|---|---|
| 9,208,505 B1* | 12/2015 | Zhou | G06Q 30/0222 |
| 2002/0023027 A1* | 2/2002 | Simonds | G06K 7/1095 |
| | | | 705/26.1 |
| 2002/0046184 A1* | 4/2002 | Villaret | G06Q 20/04 |
| | | | 705/64 |
| 2002/0060246 A1* | 5/2002 | Gobburu | G06Q 20/04 |
| | | | 235/462.46 |
| 2003/0200152 A1* | 10/2003 | Divekar | G06Q 30/06 |
| | | | 705/26.64 |
| 2005/0187873 A1* | 8/2005 | Labrou | G06Q 20/02 |
| | | | 705/40 |
| 2012/0130866 A1* | 5/2012 | Cooke | G06Q 30/0643 |
| | | | 705/27.2 |
| 2012/0150601 A1* | 6/2012 | Fisher | G06Q 20/20 |
| | | | 705/14.23 |
| 2012/0205433 A1* | 8/2012 | Dudek | G06Q 20/209 |
| | | | 235/375 |
| 2012/0265623 A1* | 10/2012 | Zhu | G06Q 30/06 |
| | | | 705/16 |
| 2012/0323710 A1* | 12/2012 | Luke | G06Q 20/20 |
| | | | 705/17 |
| 2013/0018782 A1* | 1/2013 | Zhou | G06Q 20/3276 |
| | | | 705/39 |
| 2013/0103486 A1* | 4/2013 | Hess | G06Q 30/02 |
| | | | 705/14.38 |
| 2013/0138563 A1* | 5/2013 | Gilder | G06Q 20/4016 |
| | | | 705/44 |
| 2013/0179336 A1* | 7/2013 | Lyons | G06Q 20/30 |
| | | | 705/39 |
| 2014/0040139 A1* | 2/2014 | Brudnicki | G06Q 20/227 |
| | | | 705/44 |
| 2014/0143037 A1* | 5/2014 | Zhou | G06Q 30/0226 |
| | | | 705/14.17 |
| 2014/0278906 A1* | 9/2014 | Sullivan | G06Q 30/0273 |
| | | | 705/14.38 |
| 2015/0220965 A1* | 8/2015 | Sullivan | G06Q 30/0238 |
| | | | 705/14.38 |
| 2015/0339696 A1* | 11/2015 | Zhou | G06Q 30/0222 |
| | | | 705/14.23 |
| 2015/0371215 A1* | 12/2015 | Zhou | G06Q 30/02 |
| | | | 705/71 |
| 2016/0098758 A1* | 4/2016 | Hill | G06Q 30/0261 |
| | | | 705/14.58 |
| 2016/0162873 A1* | 6/2016 | Zhou | G06Q 20/3227 |
| | | | 705/67 |
| 2016/0189137 A1* | 6/2016 | Zhou | G06Q 20/3274 |
| | | | 705/14.34 |

* cited by examiner

SYSTEMS AND METHODS FOR PROVIDING COMPENSATION, REBATE, CASHBACK, AND REWARD FOR USING MOBILE AND WEARABLE PAYMENT SERVICES, DIGITAL CURRENCY, NFC TOUCH PAYMENTS, MOBILE DIGITAL CARD BARCODE PAYMENTS, AND MULTIMEDIA HAPTIC CAPTURE BUYING

CROSS-REFERENCE TO RELATED APPLICATIONS

This application is a continuation in part of U.S. patent application Ser. No. 13/185,491, entitled 'Facilitating mobile device payments using product code scanning'.

This application is a continuation in part of U.S. patent application Ser. No. 14/815,988, entitled 'SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS', filed on Aug. 1, 2015, which claims priority to U.S. patent application Ser. No. 14/034,509, entitled 'EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING', filed on Sep. 23, 2013, and which claims priority to U.S. patent application Ser. No. 10/677,098, entitled 'EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING', filed on Sep. 30, 2003, which claims priority to U.S. Provisional Patent Application No. 60/415,546, entitled 'DATA PROCESSING SYSTEM', filed on Oct. 1, 2002, which are incorporated herein by reference in their entirety.

FIELD

This application relates generally to data processing, and more specifically to methods and systems for providing compensation for using mobile payment services.

BACKGROUND

When customers buy product items from various merchants in these merchants' retails environments, such as retail outlets, shopping centers, stores, etc., only a handful of payment methods is available to the customers. Typical examples include credit cards, debit cards, gift cards, checks, and cash. Each one of these payment methods has some drawbacks from cost and/or convenience perspectives. For example, credit cards bear substantial processing fees, while debit cards require availability of funds and sometimes involve surcharges as well. Checks and cash transactions are slow and require additional processing and/or handling. All these drawbacks interfere with retail transactions and add some level of dissatisfaction. At the same time, a customer typically visits the same group of stores repeatedly, and these payment transaction fees tend to accumulate. While some stores try to issue their own credit-like account systems and employ banks to help them in this endeavor (e.g., Sears—Chase VISA), many stores are simply too small to build and operate systems similar to the ones provide by the major credit card companies and/or banks.

Furthermore, a typical customer repeatedly visits multiple retail outlets. Requiring the customer to continuously carry multiple retail cards (or other security/transactional devices) each one being specific to only one of these outlets may be difficult, if not unreasonable. For example, a typical customer may use a few gas stations (e.g., depending on his location), a few grocery stores (e.g., depending on preferences), a few electronic stores (e.g., depending on current sales and promotions). Complexities introduced by store specific account systems may quickly offset any costs savings or inconvenience associated with traditional methods of payments and may make the overall experience even worse.

Additionally, many stores and retailers provide bonuses and discounts for regular customers to stimulate customers to return over and over.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer implemented methods and systems for providing compensation for using a mobile payment service. The method for providing compensation for using a mobile payment service may commence with receiving payment information associated with a user. The payment information may be associated with a mobile payment account of the user in the mobile payment service. The method may include generating a unique code encoding the payment information and providing the generated unique code to the user. The method may continue with receiving a deposit amount associated with a purchase related to the user. The purchase may be made via the mobile payment service. The method may further include receiving a notification about a further purchase of the user via the mobile payment service. The notification may include at least the unique code and a product barcode. The product barcode may be associated with the further purchase. The method may further include providing a compensation from the deposit amount to the user. The compensation may be associated with a payment amount associated with the further purchase.

The system for providing compensation for using a mobile payment service may include a processor and a database. The processor may be configured to receive payment information associated with a user. The payment information may be associated with a mobile payment account of the user in the mobile payment service. The processor may be further configured to generate a unique code encoding the payment information and provide the unique code to the user. Furthermore, the processor may be configured to receive a deposit amount associated with a purchase related to the user. The purchase may be made via the mobile payment service. The processor may further be configured to receive a notification about a further purchase of the user via the mobile payment service. The notification may include at least the unique code and a product barcode. The product barcode may be associated with the further purchase. Furthermore, the processor may be configured to provide a compensation from the deposit amount to the user. The compensation may be associated with a payment amount associated with the further purchase.

Also provided is a mobile payment service which enables a user to perform facilitated electronic payments from any location. For this purpose, the user may register with the mobile payment service. During the registration the user may provide his financial information. The financial information may include bank account information, credit card information, debit card information, gift card information, prepaid card information, insurance account information, merchant account information, mobile currency information, digital money account, SDK payment information, in-app payment information, social networking payment information, prepaid card information, API payment information, mobile account payment information, mobile currency information, and so forth. When required, the user may activate a haptic control associated with a mobile payment service. The haptic control may be displayed over the video output of the device and overlap other applications or pages. The haptic control may provide for mode selection elements associated with a payment mode, a messaging mode, and a calling mode. Through the haptic control the mobile payment service may receive the selection of the payment mode via the mode selection elements of the haptic control from a user. Upon the selection, context may be extracted from the display of the mobile and wearable device. Based on the context, a payment transaction type which the user intends to perform may be determined. The payment transaction type may include a payment receiving transaction and a payment sending transaction. Based on the determining, a transaction request may be generated using data of the extraction and the financial information of the user provided during the registration.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
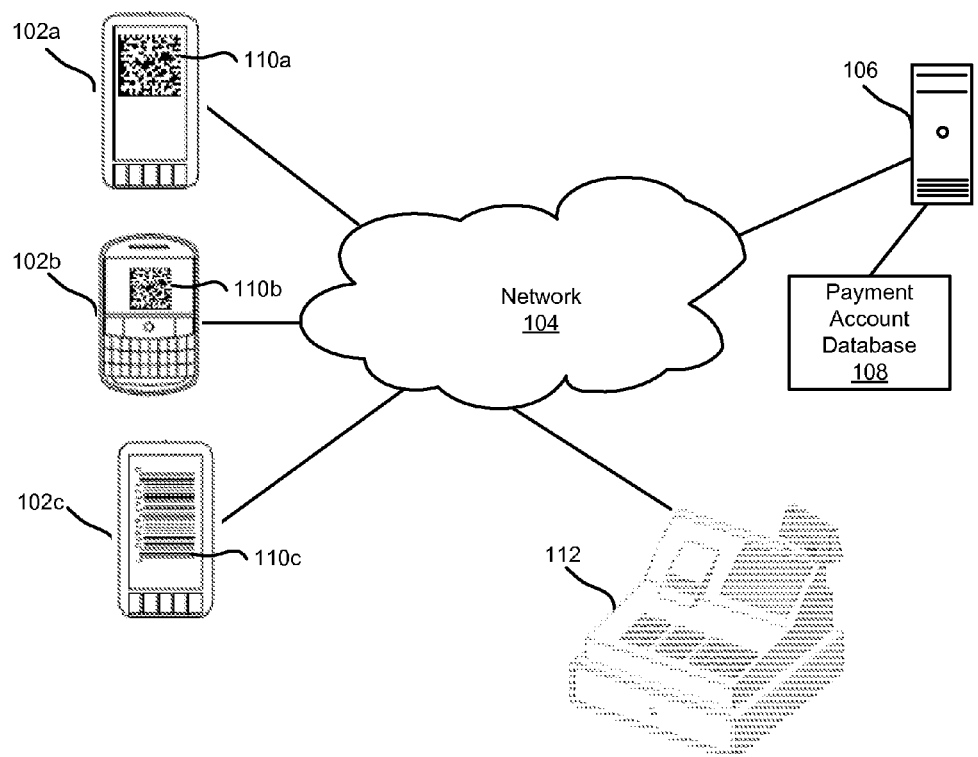
FIG. 1 is a block diagram showing an environment within which a method and system for providing compensation for using a mobile payment service can be implemented, in accordance with an example embodiment.

The following detailed description includes references to the accompanying drawings, which form a part of the detailed description. The drawings show illustrations in accordance with exemplary embodiments. These exemplary embodiments, which are also referred to herein as 'examples,' are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

Various computer implemented methods and systems for providing compensation for using a mobile payment service are described herein. Expansion of computer networks (such as Internet) gave rise to a new type of trade—electronic trade, while proliferation of mobile devices (e.g., cell phones/smart phones and other similar devices) that are capable of internet communications take electronic trade even further. A customer can shop online from any location using a mobile device, also referred herein to as a mobile and wearable device. Therefore, mobile payment services gain increasing importance.

While physical retailers provide discounts or other bonuses for regular customers, a mobile payment service can motivate customers to perform online purchases though their service repeatedly in a different way. The mobile payment service may provide a compensation, a rebate, a cashback, or a reward for using the service. The compensation can be proportional to the purchase amount. Additionally, the compensation can be associated with a particular purchase or service to the user of the mobile payment service. For example, the user buys a device via the mobile payment service. The user may be provided with a compensation for further purchases via the mobile payment service. The compensation may be provided until exhaustion of the price of the device, i.e. the summarized compensation for further purchases may be equal to the price of the device bought by the user. In such a way, the user gets a free device for using the mobile payment service.

Payments via the mobile payment service may be streamlined due to a haptic control providing quick access to payment controls. Furthermore, the haptic control may enable further communication operations, such as messaging, mobile calls, and so forth.

Additionally, to facilitate using of the mobile payment service, upon providing data on a credit or debit card, or a bank checking account via a user interface of the mobile device, the user may receive a unique code encoding payment information associated with the user. Therefore, the user may provide the payment information of the user by displaying the unique code of a client device associated with the user. The unique code may be scannable by a device of a merchant, such as a scanner, a mobile device, and so forth.

The user may scan product barcode and provide the product barcode to the merchant along with providing of the unique code associated with the user. The merchant may provide the product barcode and the unique code to the mobile payment service. Alternatively, the user may provide the product barcode and the unique code directly to the mobile payment service. Upon receipt of the product barcode and the unique code associated with the user, the transaction for the purchase may be performed by a provider of the mobile payment service.

Referring now to the drawings, FIG. 1 illustrates an environment 100 within which systems and methods for providing compensation for using a mobile payment service can be implemented. The environment 100 may include a user 120, a client device 130, network 110, a mobile payment service 800, and a system 200 for providing compensation for using a mobile payment service.

The user 120 may include an individual, organization, or entity registered in or associated with a mobile payment service 800. The user 120 may purchase a product, a device, a detail part, or receive a service from the mobile payment service 800. Purchases may be made via a haptic control shown on the screen of the client device 130. A price of the product, the device, the detail part, or the service may be deposited to the system 200. The deposit amount may equal the price of the product, the device, the detail part, or the service. When the user 120 makes further purchases via the mobile payment service 150, the user 120 may receive compensation 160 from the deposit amount. The amount of the compensation 160 may be proportional to the amount of the further purchases.

The user 120 may provide payment information of the user 120 to the mobile payment service 800. Upon receipt of the payment information from the user 120, the mobile payment service 150 may provide the user 120 with a unique code 170. The unique code 170 may encode the payment information of the user 120. When making the purchase, the user 120 may scan a barcode associated with product, the device, the detail part, or the service. The user 120 may provide the scanned product barcode 180 to the mobile payment service 800. The user 120 may send a purchase request 140 to the mobile payment service 150. The purchase request 140 may include the unique code 170 and the product barcode 180.

The mobile payment service 800 may provide a haptic control on a display of the client device 130. The haptic control may include, for example, a one-touch button. Via the haptic control, the user 120 may exchange messages with a recipient, make calls, and perform or request one-touch and one-scan payments. The messages, calls, and one-touch and one-scan payments are transmitted to the mobile payment service 800 and further to the recipient or payee (not shown) via the network 110 using the client device 130.

The user 120 may communicate with the mobile payment service 800 and the system 200 via the network 110 using the client device 130. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 110 may include any suitable number and type of devices (e.g., routers and switches) for forwarding commands, content, and/or web object requests from each client to the online community application and responses back to the clients.

The client device 130, in some example embodiments, may include a Graphical User Interface (GUI) for displaying the user interface associated with the system 200 and the mobile payment service 150. In a typical GUI, instead of offering only text menus or requiring typed commands, the system 200 may present graphical icons, visual indicators, or special graphical elements called widgets that may be utilized to allow the user 120 to interact with the system 200 and/or the mobile payment service 150. The client device 130 may be configured to utilize icons used in conjunction with text, labels, or text navigation to fully represent the information and actions available to user 120.

The client device 130 may include a mobile telephone, a computer, a laptop, a smart phone, a tablet personal computer (PC), a wearable device, an eyeglass device, and so forth. When the user 120 makes one of further purchase, a purchase request 140 may be sent to the mobile payment service 150. The purchase request 140 sent by the user 120 via the client device 130 may be stored and executed by the mobile payment service 150. Additionally, the system 200 can be informed about the purchase request 140 and about execution of the purchase request 140. The system 200 may then calculate an amount of the compensation 160 and provide the compensation 160 to the user 120.

Figure 2:
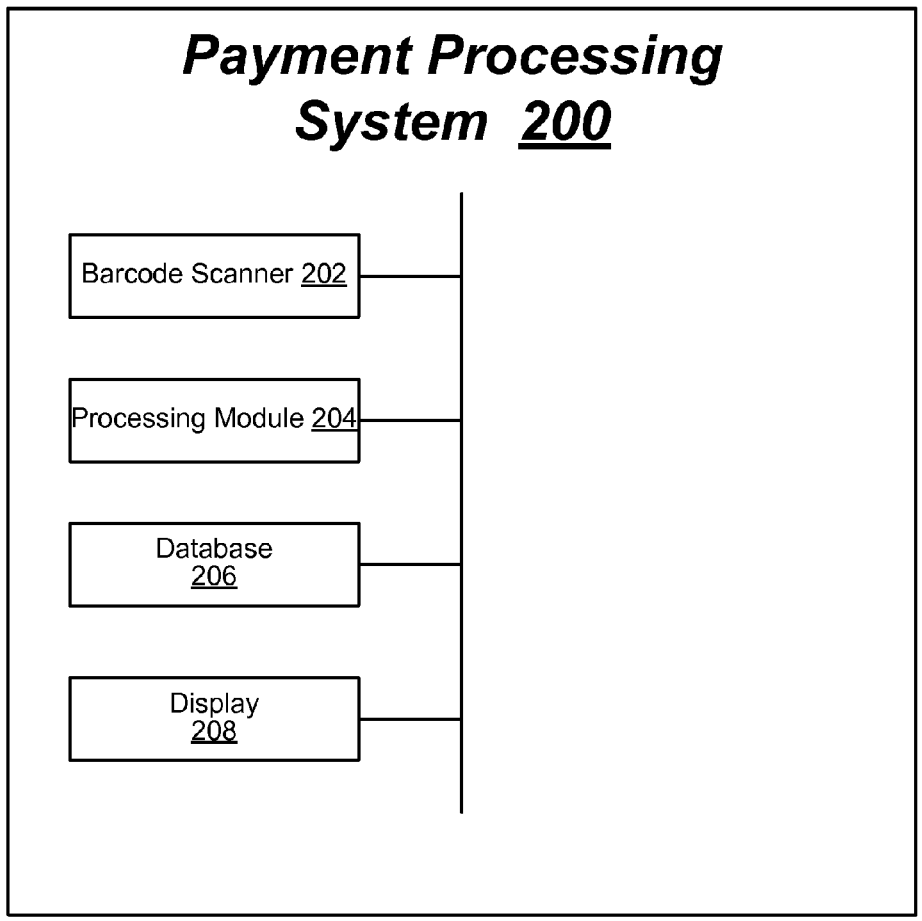
FIG. 2 is a block diagram showing various modules of a system for providing compensation for using a mobile payment service, in accordance with certain embodiments.

FIG. 2 is a block diagram showing various modules of the system 200 for providing compensation for using a mobile payment service, in accordance with certain embodiments. The system 200 may comprise a processor 210 and a database 220. The processor 210 may include a programmable processor, such as a microcontroller, central processing unit (CPU), and on forth. In other embodiments, the processor 210 may include an application-specific integrated circuit (ASIC) or programmable logic array (PLA), such as a field programmable gate array (FPGA), designed to implement the functions performed by the system 200.

The processor 210 may be configured to receive payment information associated with a user. The payment information may be associated with a mobile payment account of the user in the mobile payment service. In an example embodiment, the payment information includes one or more of the following: bank account information, credit card information, debit card information, gift card information, digital money information, and so forth. The payment information may be associated with a payment transaction. The payment transaction may include one or more of the following: a face-to-face barcode scanning payment transaction, a short distance Bluetooth payment transaction, a remote long distance Internet payment transaction, and so forth. The payment transaction may be associated with one or more of the following: Unstructured Supplementary Service Data, Short Message Service, direct operator billing, a credit card mobile payment, an online wallet, a Quick Response (QR) code payment, a contactless near field communication payment, a cloud-based mobile payment, an one-touch payment, an one-scan payment, an audio signal-based payment, a Bluetooth Low Energy signal beacon payment, an in-application payment, a social networking payment, a trade token payment, a merchant token payment, a currency token payment, and a direct carrier and bank co-operation.

Additionally, the payment transaction may be associated with a third party application. The payment transaction may be associated with one or more of an application programming interface and a software development kit. The payment transaction may be further associated with one or more of the following: a fingerprint touch recognition payment, a fingerprint press recognition payment, a gesture mark payment, a voice command payment, and eye blink payment, a fingerprint swipe recognition payment, and a nod payment.

Furthermore, the payment transaction may be associated with a Near Field Communication (NFC), and the payment transaction may be performed for purchases online and offline. A payment associated with the payment transaction may be transferred from a pre-paid account of the user or charged to a mobile account of the user or a bank account of the user. The payment may include at least a one-touch and one-scan payment for street parking in demarcated areas, the payment being performed using a license plate, transponder tags, barcode stickers, and reading the code from the display. A merchant may use uses a combination of the NFC and the code on the display for performing the one-touch and one-scan payment. The NFC may be used to establish radio communication with an external device by touching the housing of the external device or bringing the housing and the external device into proximity, such as a distance of up to 10 centimeters. The processor may be operable to operate in three modes, the three modes include an NFC target mode when the device is acting as a credential, a NFC initiator mode when the device is acting as a reader, and an NFC peer-to-peer mode. The payment may be further associated with advertisement tags, two-dimensional barcodes, and ultra high frequency tags. The processor may be operable to be connected to a cloud. User credentials may be provisioned over the air. The payment may be associated with a payment application associated with the processor to control transferring of the payment and access payment readers.

The processor 210 may be further configured to generate a unique code. The unique code may encode the payment information. In an example embodiment, the unique code includes one or more of the following: a QR code, a linear code, and a two-dimensional code. Upon generating of the unique code, the processor 210 may provide the unique code to the user.

The processor 210 may be further configured to receive a deposit amount associated with a purchase related to the user. The deposit amount may be equal to a price of the purchase. The purchase may be made via the mobile payment service. In an example embodiment, the purchase includes a product, a device, a detail part, a service provided to the user, and so forth.

The processor 210 may be further configured to receive a notification about a further purchase of the user via the mobile payment service. The notification may include at least the unique code and a product barcode. The product barcode may be associated with the further purchase.

In some embodiments, the user may scan the product barcode in a retail shop. Furthermore, the product barcode may be provided on a web-site associated with the product, the device, the part of the device of the service which the user wishes to buy. The user may store the product barcode from the web-site. When user wishes to perform the purchase, the user may send a purchase request to the mobile payment service. The purchase request may include at least the unique code and the product barcode.

Thus, the processor 210 may receive the payment information associated with the mobile payment account of the user in the form of the unique code and the product information in the form of the product barcode. Upon receiving the notification, the processor 210 may be configured to provide a compensation from the deposit amount. The processor 210 may be further configured to calculate the compensation based on the notification. The calculation may be performed according to predefined criteria. The predetermined criteria may include providing information on a bank checking account, participating in affiliate marketing and loyalty programs, participating in group buying offers made by the mobile service provider, a mobile network operator, a mobile device company, or other merchants.

The compensation may be associated with a payment amount associated with the further purchase. In an example embodiment, the compensation may amount to a predetermined percent of the payment amount. The processor 210 may be further configured to deduct the compensation from the deposit amount based on the providing of the compensation. Therefore, in an example embodiment, the compensation may be provided to the user until the deposit amount exhausts. In some embodiments, the compensation may be transferred to the mobile payment account of the user.

At least data associated with the deposit amount and the payment information may be stored in the database 220 and may be accessible for user.

In some embodiments, the system 200 can also include a user interface (not shown) configured to visualize data associated with the mobile payment service.

Figure 3:
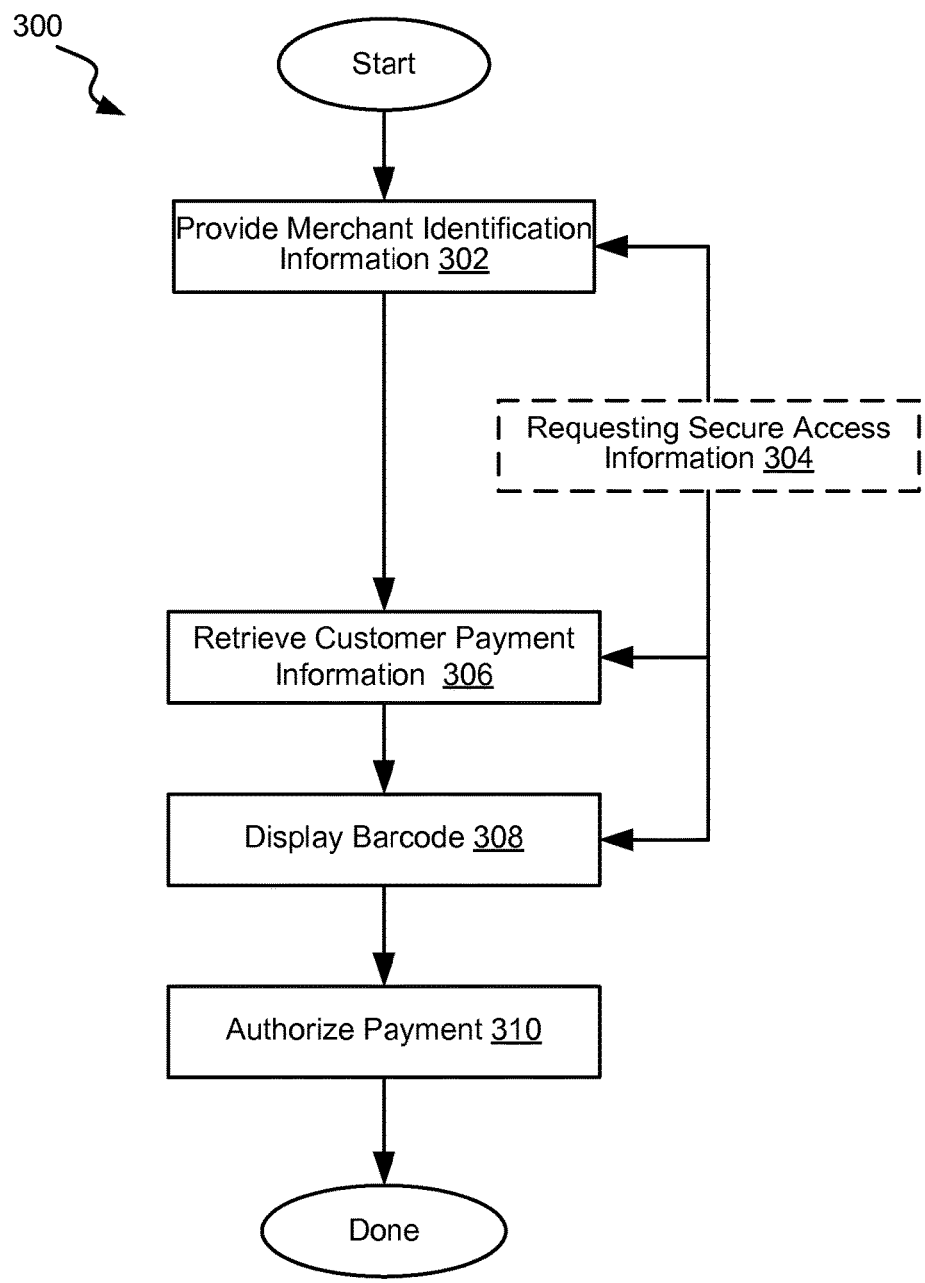
FIG. 3 is a flow chart illustrating a method for providing compensation for using a mobile payment service, in accordance with certain embodiments.

FIG. 3 is a flow chart illustrating a method 300 for providing compensation for using a mobile payment service, in accordance with some example embodiments. The method 300 may be performed by logic that may comprise hardware (e.g., dedicated logic, programmable logic, and microcode), software (such as software run on a general-purpose computer system or a dedicated machine), or a combination of both. In one example embodiment, the processing logic resides at the system 200 for providing compensation for using a mobile payment service shown on FIG. 2, and the various elements of the system 200 can perform the method 300. It will be appreciated by one of ordinary skill that examples of the foregoing modules may be virtual, and instructions said to be executed by a module may, in fact, be retrieved and executed by software. Although various elements may be configured to perform some or all of the various operations described herein, fewer or more elements may be provided and still fall within the scope of various embodiments.

As shown in FIG. 3, the method 300 may commence at operation 310 with receiving payment information associated with a user. The payment information may be associated with a mobile payment account of the user in the mobile payment service. The payment information may include one or more of the following: bank account information, credit card information, debit card information, gift card information, digital money information, and so forth.

At operation 320, the processor may generate a unique code. The unique code may encode the payment information associated with the user. The unique code may include one or more of the following: a QR code, a linear code, and a two-dimensional code. At operation 330, the processor may provide the unique code to the user.

The method 300 may further include receiving a deposit amount associated with a purchase related to the user at operation 340. The purchase may be made via the mobile payment service. In an example embodiment, the deposit amount equals a price of the purchase.

The method 300 may further include receiving a notification about a further purchase of the user via the mobile payment service at operation 350. The notification may include at least the unique code and a product barcode. The product barcode may be associated with the further purchase. Additionally, the notification may include credentials associated with the mobile payment account of the user. Thus, the user can be authenticated and associated with the deposit amount based on the notification.

At operation 360, the method 300 may include providing a compensation from the deposit amount. The compensation may be associated with a payment amount associated with the further purchase. In an example embodiment, the compensation amounts to a predetermined percent from the payment amount. In a further example embodiment, the method 300 includes calculating the compensation based on a payment amount associated with the further purchase. For example, the compensation can equal 3% of the payment amount of the further purchase. The calculation may be performed according to predefined criteria. The method 300 may further comprise deducting the compensation from the deposit amount. Therefore, the compensation may be provided to the user until the deposit amount exhausts. In some embodiments, the user is allowed to use the compensation for payments in the mobile payment service only. In the result, the user can receive the full price of the purchase for the further purchases using the mobile payment service. Thus, the user can receive the purchase for free.

Additionally, the method 300 may include scanning the unique code from a screen of a mobile device associated with the user. Additionally, the method 300 may include scanning the product barcode from the screen of the mobile device associated with the user. The scanning of the unique code and the scanning of the product barcode may be performed by a provider of the product, the detail, the part of the detail, and the service. Alternatively, the unique code and the product barcode may be received by the mobile payment service from the user.

Additionally, the method 300 may receiving, by the processor, a first user input. The first user input may include touch engagement of a finger of the user with a display of the mobile device associated with the user. Based on the first user input, the processor may initiate one or more sensors of the mobile device to capture multimedia to obtain captured multimedia. The method 300 may continue with receiving, by the processor, a second user input. The second user input may include touch release of the finger of the user from the display of the mobile device. The processor may analyze data associated with the first user input and the second user input and, in particular, may determine time between the first user input and the second user input. Based on the analysis, the processor may selectively select a multimedia capture mode or a payment transaction mode. If the multimedia capture mode is selected, the processor may record the captured multimedia to a database to obtain recorded multimedia. A type of the multimedia being recorded may be determined based on the time between the first user input and the second user input. If the payment transaction mode is selected, the processor may receive transaction data. The transaction data may include at least a payment amount and a recipient. Based on the transaction data, user payment data, and recipient payment data, the processor may perform a payment transaction. The user payment data and the recipient payment data may be stored in the database. The first user input and the second user input may be performed on the mobile device, the mobile device including one or more of the following: a handheld computing device, a smartphone, a tablet computer, a personal digital assistant, a e-textile item, an activity tracker, a smartwatch, smartglasses, a Global Positioning System watch, a mixed reality device, a computer-mediated reality device, a clothing technology device, and a wearable device. The mobile device may have a band adapted to secure the mobile device on a human body. The human body may include one or more of the following: a wrist, an arm, a neck, a head, a leg, a waist, an ear, a finger, and any other part of the human body. The band may be adapted to secure the mobile device under, within, or on clothing.

In an example embodiment, the mobile payment service may be provided by a service provider. The mobile payment service may provide for making payments using a provider terminals or a compatible device. The compatible device may work with a Pay Wave application associated with Visa, Pay Pass application associated with MasterCard, and Express Pay terminals associated with American Express. The mobile payment service may be associated with making payments at contactless points of sale and in application associated with iOS operating system or Android operating system. Furthermore, the mobile payment service may be associated with a two-factor authentication using an NPC antenna and a chip that stores the encrypted payment information. The mobile payment service may be operable to generate a dynamic security code for each transaction. Additionally, the mobile payment service may be operable to link a payment card associated with the user to the mobile payment service. The payment card may be added by indicating a user bank account by the user, taking a photo of the payment card, and entering the payment card information manually by the user.

Figure 4:
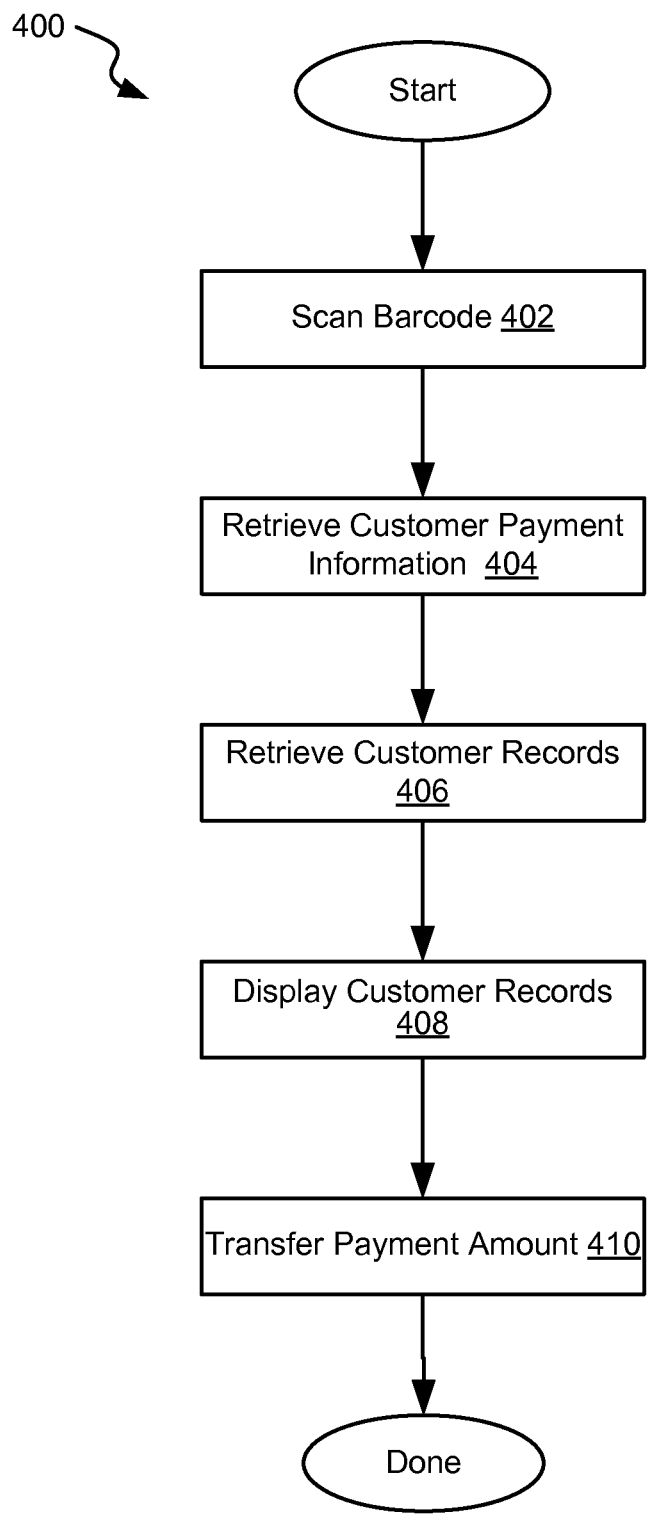
FIG. 4 is a flow chart illustrating a method for providing compensation for using a mobile payment service, in accordance with certain embodiments.

FIG. 4 a flow chart illustrating a method 400 for providing compensation for using a mobile payment service, in accordance with some example embodiments. The method 400 may commence at operation 410 with receiving payment information associated with a user. The payment information may be associated with a mobile payment account of the user in the mobile payment service. The payment information may include one or more of the following: bank account information, credit card information, debit card information, gift card information, digital money information, and so forth.

At operation 420, the processor may generate a unique code. The unique code may encode the payment information. The unique code may include one or more of the following: a QR code, a linear code, and a two-dimensional code. At operation 430, the processor may provide the unique code to the user.

The method 400 may further include receiving a deposit amount associated with a purchase related to the user at operation 440. The purchase may be made via the mobile payment service. In an example embodiment, the deposit amount equals a price of the purchase. The purchase may include a product, a device, a detail part, a service provided to the user, and so forth.

The method 400 may continue with operation 450, at which a notification about one or more further purchases of the user via the mobile payment service may be received. The notification may include at least the unique code and one or more product barcodes. The product barcode may be associated with the one or more further purchases.

At operation 460, one or more compensations may be provided to the user. The one or more compensations may associated with a payment amount associated with the one or more further purchases.

The method 400 may further include summarizing the one or more compensations to obtain a summarized compensation at operation 470. At operation 480, the processor may determine that the summarized compensation is equal to the deposit amount.

Base on the determining, a free product or a free service may be provided to the user at operation 490. In an example embodiment, the free product is provided by a provider of the mobile payment service. A cost of the free product or the free service may be equal to the deposit amount.

In an example embodiment, the compensation may include one or more of the following: loyalty credits provided for participation in loyalty programs, a repayment of a percentage of an amount of purchases made with a mobile payment service provider, a refund of bank services, a discount on mobile services, free mobile services, zero monthly fees, free bank services, free insurance services, saved payment card charges, and so forth.

Figure 5:
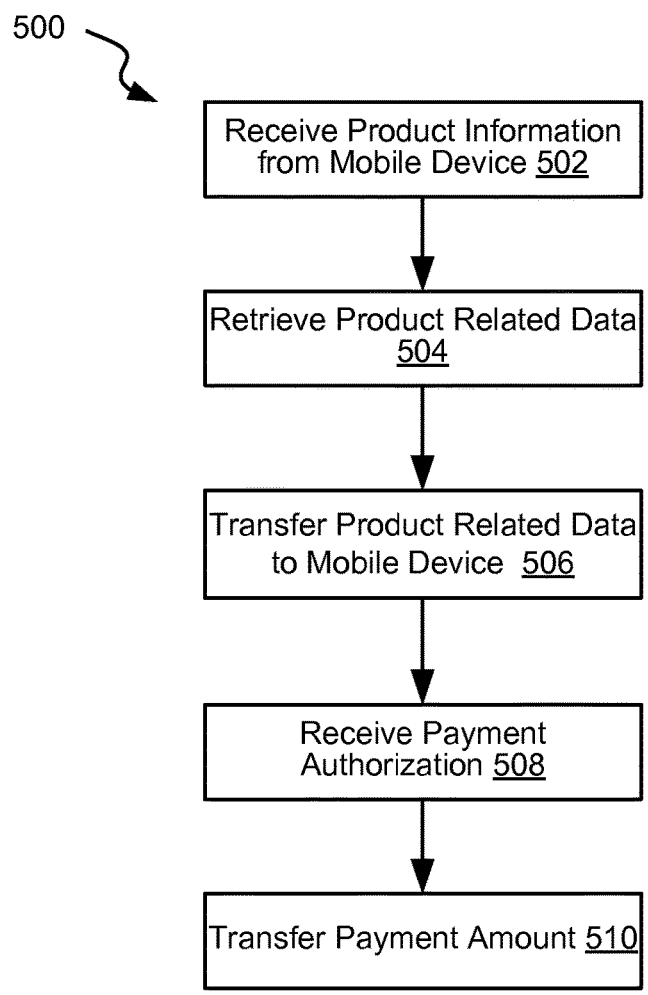
FIG. 5 is a block diagram illustrating a purchase via a mobile payment service associated with a system for providing compensation for using a mobile payment service, in accordance with certain embodiments.

FIG. 5 is a block diagram illustrating a purchase 500 via a mobile payment service associated with a system for providing compensation for using a mobile payment service, in accordance with certain embodiments. A user 502 purchases a device 504 via the mobile payment service 150. Though in this case the device 504 is used to illustrate a purchase, other variants are possible, such as purchasing a product, a detail part, or a service.

The user 502 transfers a payment amount 506 for the device 504. The payment amount is stored as a deposit amount 408 in the system 200 for providing compensation for using mobile payment service.

Figure 6:
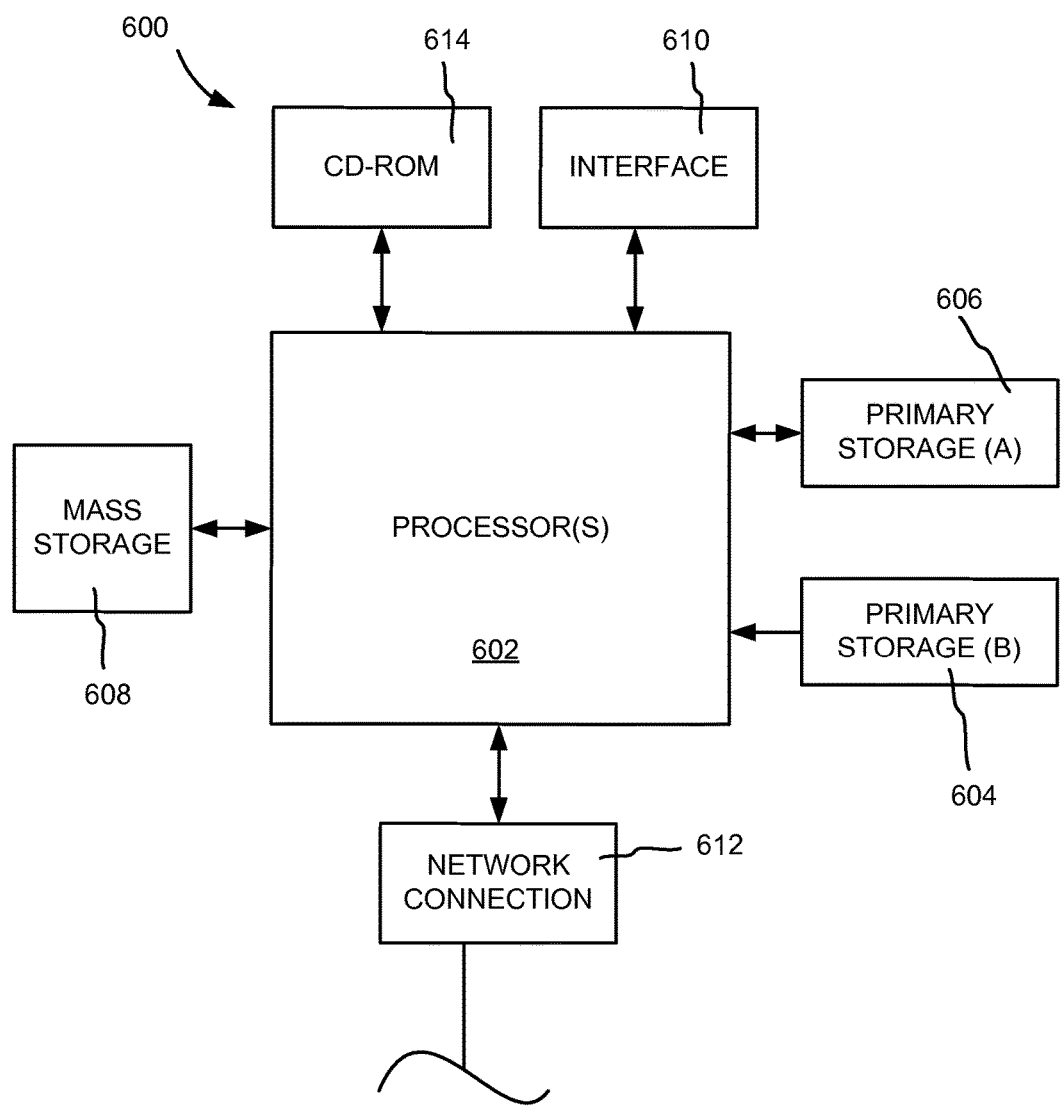
FIG. 6 is a block diagram illustrating providing of a compensation for purchases via a mobile payment service, in accordance with certain embodiments.

FIG. 6 is a block diagram illustrating a compensation 600 for a further purchase via a mobile payment service, in accordance with certain embodiments. When the user 502 makes a further purchase 604 via the mobile payment service 150, the system 200 is notified. The notification includes at least the payment amount of the further purchase, a unique code encoding the payment information of the user 502, a product barcode associated with the further purchase 604, and credentials of the user 502 to associate the user 502 with the mobile payment account. In some embodiments, the mobile payment service 150 sends a confirmation 606 of the further purchase to the system 200 to verify that the further purchase is successful.

Based on the notification, the system 200 calculates the compensation 608 for the further purchase and transfers the compensation to the account associated with the user 502. The compensation is calculated based on predetermined criteria. For example, the compensation can equal 3 percent of the payment amount of the further purchase.

Figure 7:
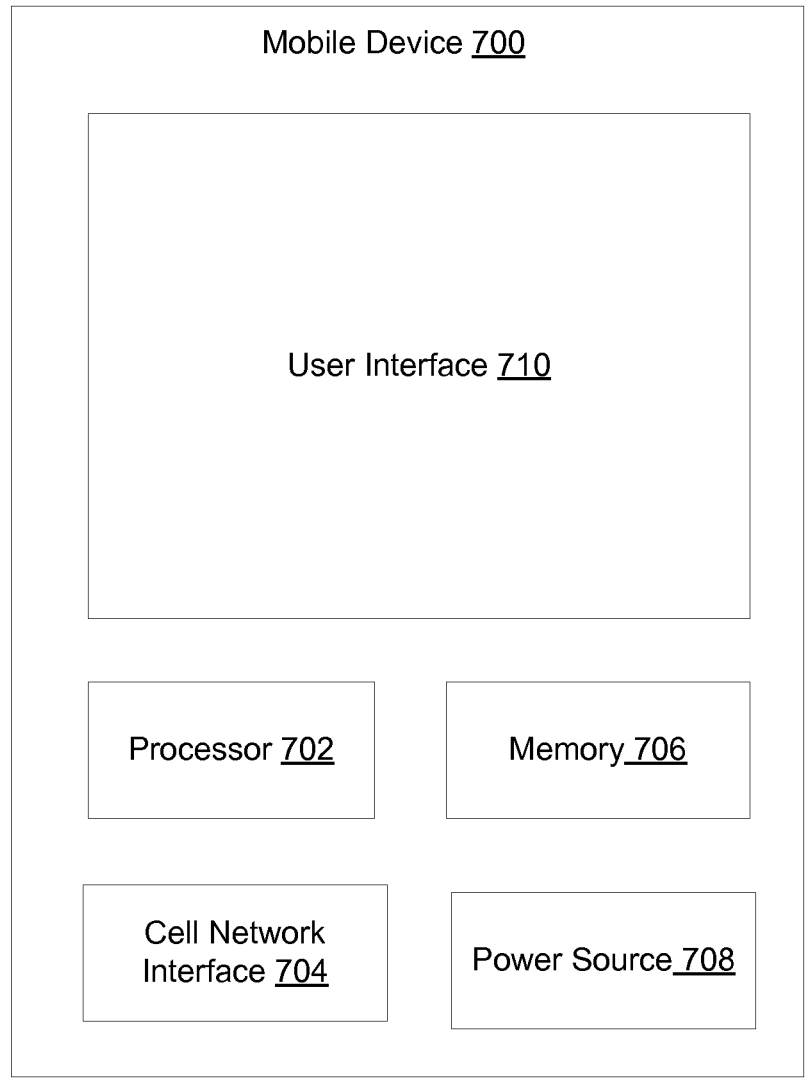
FIG. 7 is a block diagram illustrating an example of receiving compensation for using a mobile device payment service, in accordance with certain embodiments.

FIG. 7 is a block diagram illustrating an example receiving of compensation for using mobile device payment services, in accordance with certain embodiments. As shown in FIG. 7, a user 702 may provide bank checking account information 710 upon registration with a provider 704 of the mobile payment service or participate in affiliate marketing programs 710 and loyalty programs 740 of the provider 704 of the mobile payment service and receive a predetermined amount of compensation 718. The user 702 may also participate in group buying offers 716 made by a mobile network operator 706 or a mobile device company 708. The mobile network operator 706 and the mobile device company 708 may be associated with the provider 704 of the mobile payment service. Therefore, the user 702 may further receive predetermined amount of compensation.

The compensation 718 may include providing loyalty credits for participation in loyalty programs, repaying a percentage of an amount of purchases made with the mobile payment service provider, providing a refund of bank services and/or a discount on mobile services, providing zero monthly fee, or free bank services. In certain embodiments, the compensation 718 may also include saved payment card charges when providing data related to a bank checking account. A high amount of compensation may entitle the customer to receive free insurance services and/or free bank services from a bank of the mobile payment service provider.

Purchases via the mobile payment service 800 as well as other operations may be performed using a haptic control hovering over output of a client device. Operations made using the haptic control will be described with reference to FIGS. 8-11.

Figure 8:
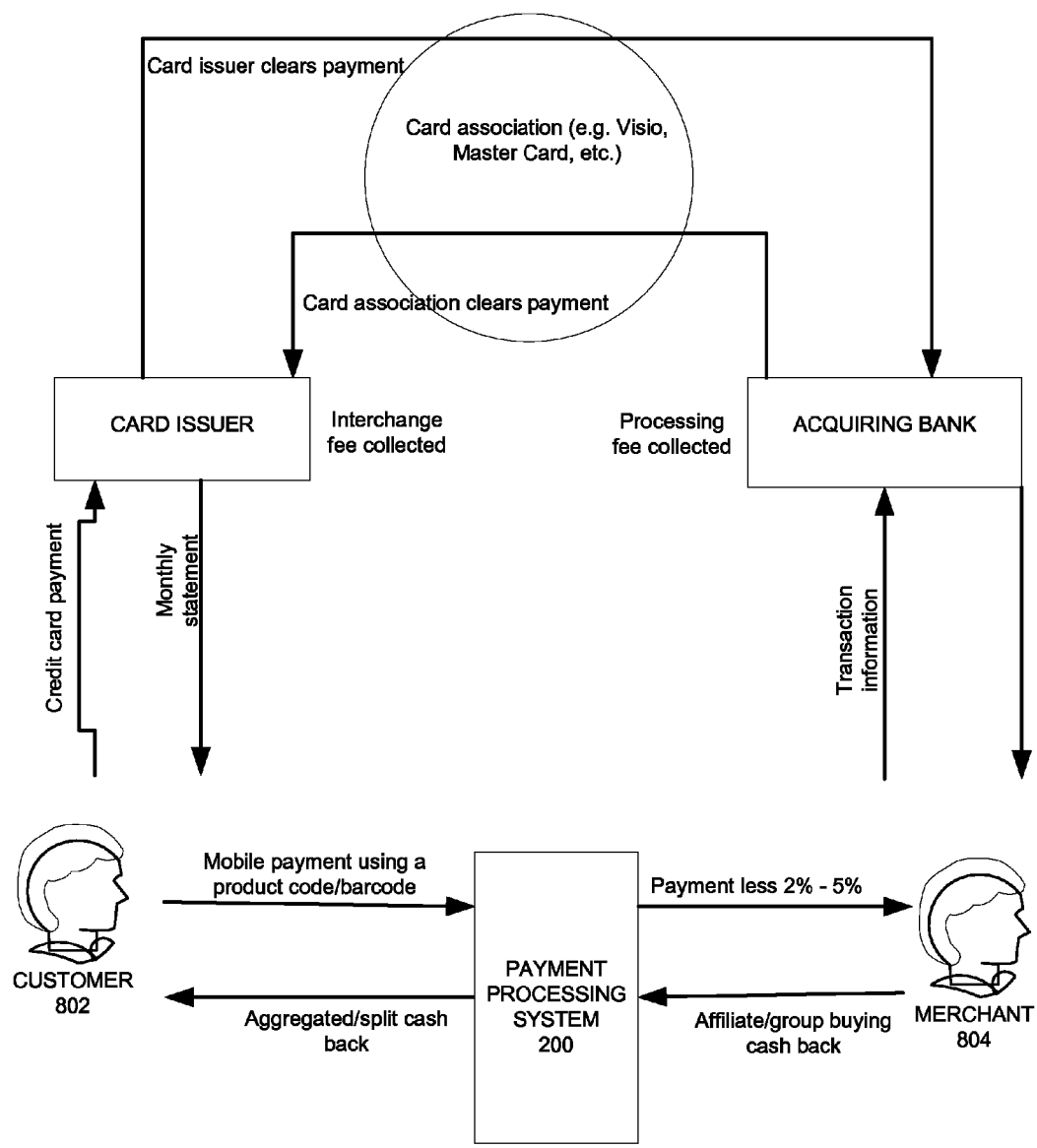
FIG. 8 is a block diagram showing various modules of the mobile payment service, in accordance with certain embodiments.

FIG. 8 is a block diagram showing various modules of the mobile payment service 800, in accordance with certain embodiments. The mobile payment service 800 may comprise a processor 802 a database 804, and a haptic control 806. The processor 802 may include a programmable processor, such as a microcontroller, central processing unit (CPU), and so forth. In other embodiments, the processor 802 may include an application-specific integrated circuit (ASIC) or programmable logic array (PLA), such as a field programmable gate array (FPGA), designed to implement the functions performed by the mobile payment service 800. Thus, the processor 802 may provide a haptic control associated with the mobile payment service 800. The haptic control 806 may be represented, for example, by a one-touch button shown on a display of a mobile and wearable device. The haptic control 806 may overlap other visual elements on the display so that the haptic control 806 was always visible for the user and not hidden by other screens. In some embodiments, the haptic control 806 may be integrated with a mobile application associated with the mobile and wearable device and/or the mobile payment service 800. The haptic control 806 may provide mode selection elements associated with a payment mode, a messaging mode, and a calling mode. The processor 802 may further receive the selection of the payment mode via the mode selection element of the haptic control 806 from a user. When the payment mode is selected, the processor may extract context from the display of the mobile and wearable device. The context may include information on a web page, an application screen, or a message in view on the display. For example, the context may include a check-out page of an online shop. Based on the context, the processor 802 may determine a payment transaction type (i.e. a payment receiving transaction or a payment sending transaction) which the user intends to perform. For this purpose, the processor 802 may parse the context and identify key words associated with a specific payment transaction type. For instance, the payment sending transaction may be associated with the following key words: "check-out," "cart," and so forth. According to the determined transaction, a transaction request may be sent to a financial institution using the information extracted from the context and financial information of the user stored in the database 804. The financial information may include one or more of the following: bank account information, credit card information, debit card information, gift card information, prepaid card information, insurance account information, merchant account information, mobile currency information, and digital money. In some embodiments, the transaction request may be associated with a virtual currency.

The transaction request may be sent without requesting financial information, authorizing, or confirmations from the user. However, in some embodiments, the user, with the help of options of the mobile payment service 800, may select to receive a confirmation request before sending the transaction request. When this option is selected, a confirmation request associated with the transaction request may be provided to the user on the display before the transaction request is transmitted.

Furthermore, the user may select a messaging mode via the mode selection elements of the haptic control 806. Then, the processor may provide a messaging interface on the display of the mobile and wearable device. When a message and a choice of a recipient is received from the user via the messaging interface, the processor 802 may send the message to the recipient via a data network.

If the calling mode is selected via the haptic control 806, the processor 802 may provide a calling interface on the display of the mobile and wearable device. Via the calling interface, the processor 802 may receive a call recipient from the user and initiate a data network call to the call recipient. The data network call may be made via a free Voice over IP (VoIP) service, a free Over-the-Top (OTT) service, and so forth.

FIG. 3 is a flow chart illustrating a method 300 for messaging, calling, and one-touch and one-scan payments and buying via the mobile payments service 800, in accordance with some example embodiments. The method 900 may be performed by logic that may comprise hardware (e.g., dedicated logic, programmable logic, and microcode), software (such as software run on a general-purpose computer system or a dedicated machine), or a combination of both. In one example embodiment, the processing logic resides at the mobile payments service 800, and the various elements of the mobile payments service 800 can perform the method 900. It will be appreciated by one of ordinary skill that examples of the foregoing modules may be virtual, and instructions said to be executed by a module may, in fact, be retrieved and executed by software. Although various elements may be configured to perform some or all of the various operations described herein, fewer or more elements may be provided and still fall within the scope of various embodiments.

Figure 9:
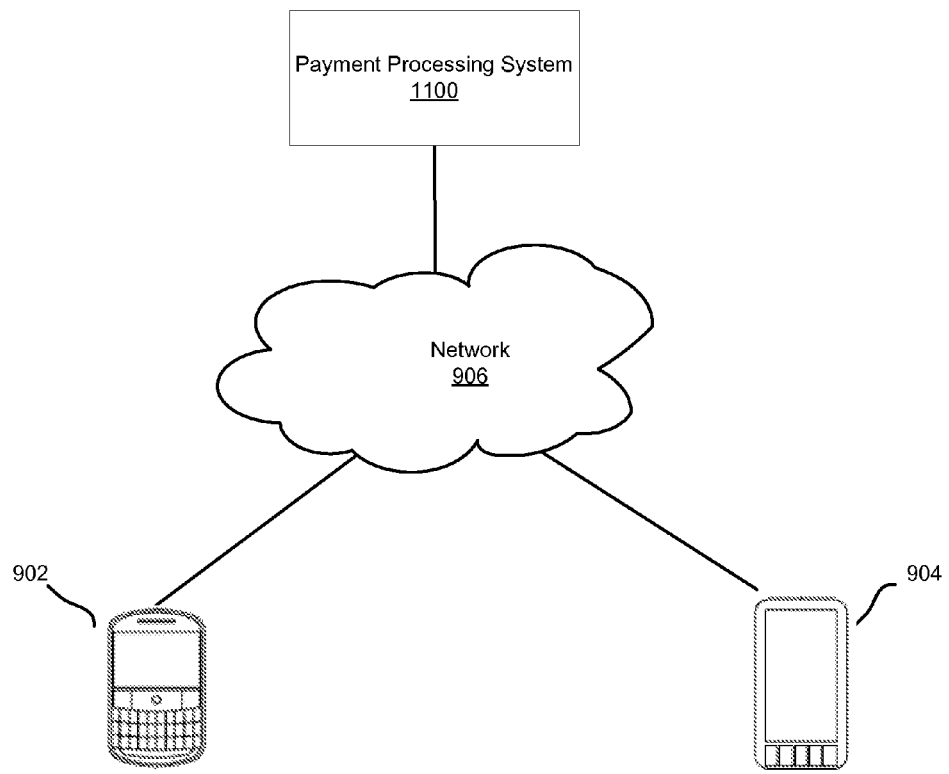
FIG. 9 is a flow chart illustrating a method for messaging, calling, and one-touch and one-scan payments and buying using the mobile payment service, in accordance with certain embodiments.

As shown in FIG. 9, the method 900 may commence at operation 902 with providing a haptic control on the display of the mobile and wearable device. The haptic control includes mode selection elements associated with a payment mode, a messaging mode, and a calling mode. The haptic control may be providing on receiving a request to initiate the haptic control from the user. To initiate the haptic control, the user may be prompted to provide a password, a code, a voice command, biometric data, and so forth. The user may interact with the haptic control by touch to a specific area of the haptic control associated with one of the mode selection elements. Additionally, the selection of the activity mode may include a voice command, a move command, and so forth. When the user touches one of the mode selection elements, the system determines which of the elements was touched.

At operation 904, a selection of the payment mode via the mode selection elements of the haptic control is received from the user. Upon the selection, context is extracted from the display at operation 906. Information from the screen in view on the mobile and wearable device and be captured and analyzed to identify the context. Based on the context, a payment transaction type to be performed may be determined at operation 908. Thus, it may be determined whether the user is performing a payment or requesting a payment based on the information on the display of the mobile and wearable device.

Based on the determining of the payment transaction type, a transaction request associated with the determined payment transaction type may be sent at operation 910. The transaction request may include the extracted information and/or financial data and authorizing data associated with the user. The financial data and authorizing data may be provided by the user during registration and stored by the mobile payment service. The financial information may include bank account information, credit card information, debit card information, gift card information, prepaid card information, insurance account information, merchant account information, mobile currency information, digital money, and so forth. The transaction request may be sent to a financial operation for processing. The financial organization performing the payment may be a bank, a credit company, a virtual currency system, and so forth.

Furthermore, if the messaging mode is selected via the haptic control, the mobile payments service 800 of FIG. 8 may provide to the user a messaging interface on the mobile and wearable device. Through the messaging interface a message may be received from the user and sent to a recipient via a data network. The message may include a text, an audio, a video, and geographical data. Additionally, messages may be received from other users. The haptic control may notify the user that one or more messages were received. The user may activate the messaging interface to read and/or reply to the messages.

If the calling mode is selected, a calling interface may be provided to the user. The user may select a call recipient in his contacts and make a call request. The mobile payments service 800 may receive the call request from the user. Based on the call request, the mobile payments service 800 may initiate a data network call. The call may include an audio call, a video call, a holographic video call, and so forth. The call may be performed via a Voice over IP (VoIP) service, a free Over-the-Top (OTT) service, and so forth. The free VoIP service and the free OTT service include voice communication, fax, text messaging, voice messaging, video communication, and multimedia transmission. In various embodiments, the free VoIP service and the free OTT service are provided via Wi-Fi, 3G network, 4G network, 5G network, 6G network or upper.

In an example embodiment, the mobile payments service 800 may authenticate an identity of the user. The authentication may include one or more of the following: a password authentication, a voice authentication, and a biometric authentication. The biometric authentication may include one or more of a fingerprint authentication, an iris pattern authentication, a heartbeat authentication, a vein pattern identification, and so forth. The vein pattern identification may be performed using scanning of one or more of the following: a palm vein pattern, a wrist vein pattern, a hand vein pattern, a leg vein pattern, a foot vein pattern, a neck vein pattern, and a head vein pattern of the user. The fingerprint authentication may include scanning fingerprints swiped across one or more or the following: a screen of the mobile and wearable device, a button of the mobile and wearable device, a rear panel of the mobile and wearable device, and so forth.

In an example embodiment, the mobile payments service 800 may receive, based on the determining of the payment transaction type which the user intends to perform, data of a payment card associated with the user. The data of the payment card may be received by scanning the payment card. The payment card may be scanned by a camera of the mobile and wearable device by positioning the payment card in proximity to camera of the mobile and wearable device. The payment card may be associated with one or more of the following: a bank account of the user, a virtual currency account of the user, and the like. The bank account of the user and the virtual currency account of the user may be linked to a mobile and wearable device number.

In an example embodiment, the data of the payment card may be stored into a cloud network. In some embodiments, the data of the payment card may be stored in the cloud network as a token.

In some embodiments, the transaction request may include a unique code associated with the user. The unique code may encode at least bank account information of the user and a payment amount. In further embodiments, the unique code may be displayed on the mobile and wearable device for scanning by the merchant.

In a further example embodiment, the mobile payments service 800 may receive product data based on scanning of the product data by the mobile and wearable device associated with the user. The product data may be associated with one or more products. Upon receiving of the scanning, the mobile payments service 800 may calculate a total price for the one or more products. Furthermore, merchant data may be received. In some embodiments, the merchant data may be received by scanning a code associated with the merchant. A scanned code associated with the merchant may include at least a QR code associated with the merchant. The QR-code associated with the merchant can be stored in the mobile and wearable device of the user. The QR-code associated with the merchant may encode at least a merchant account number. In further embodiments, the transaction request may comprise at least the total price and the merchant data.

The mobile payments service 800 may determine that the total price for the one or more products exceeds a predetermined price. Based on the determining, the mobile payments service 800 may send a notification to a merchant.

In some embodiments, the transaction request may include at least a user phone number. In such a case, the payment sending transaction may include sending a payment from a phone account of the user to a merchant account.

In further embodiments, the payment receiving transaction and the payment sending transaction may be performed by pairing of the mobile and wearable device and a merchant device using a reader. The reader may be connected to the merchant device and plugged into the mobile and wearable device.

In some embodiments, the mobile application associated with the mobile and wearable device and the mobile payments service 800 may be integrated into a software development kit and an operating system of the mobile and wearable device. The operating system may be selected from iOS, Android, and Windows Phone. Upon launch of the mobile application by the user, the user may be prompted to log in and asked to provide a consent that the mobile application may initiate future payments on behalf of the user. Additionally, during further purchases the mobile application may be launched by default without a need for a further action (such as entering a login and a password by the user) from the user to initiate launching of the mobile application. The mobile application may associated with performing payments and buying products or services in the Internet.

Thus, one-touch and one-scan payment and buying features may improve buying experience for customers and merchant. Additionally, for the user that pays and buys products and services using the mobile application associated with one-touch and one-scan payment and buying, the number of taps and times the user is required to enter a user login (identification number) and a password for future purchases may be minimized.

In some embodiments, upon launching of the at least one mobile application by the user, a list of payment cards may be provided for selection by the user. The payment cards may be associated with one or more of the following: a bank account, a bank mobile account, a service provider account, a digital currency, a universal national currency token interface, a national digital currency, an electric payment card, and the like. Upon the selection, a token may be sent to the mobile and wearable device. The token may be associated with a selected payment card, and further payments may be performed using the token.

In further embodiments, the processor of the mobile payments service 800 may be further configured to download applications, receive and set text, video, and multimedia data.

Figure 10:
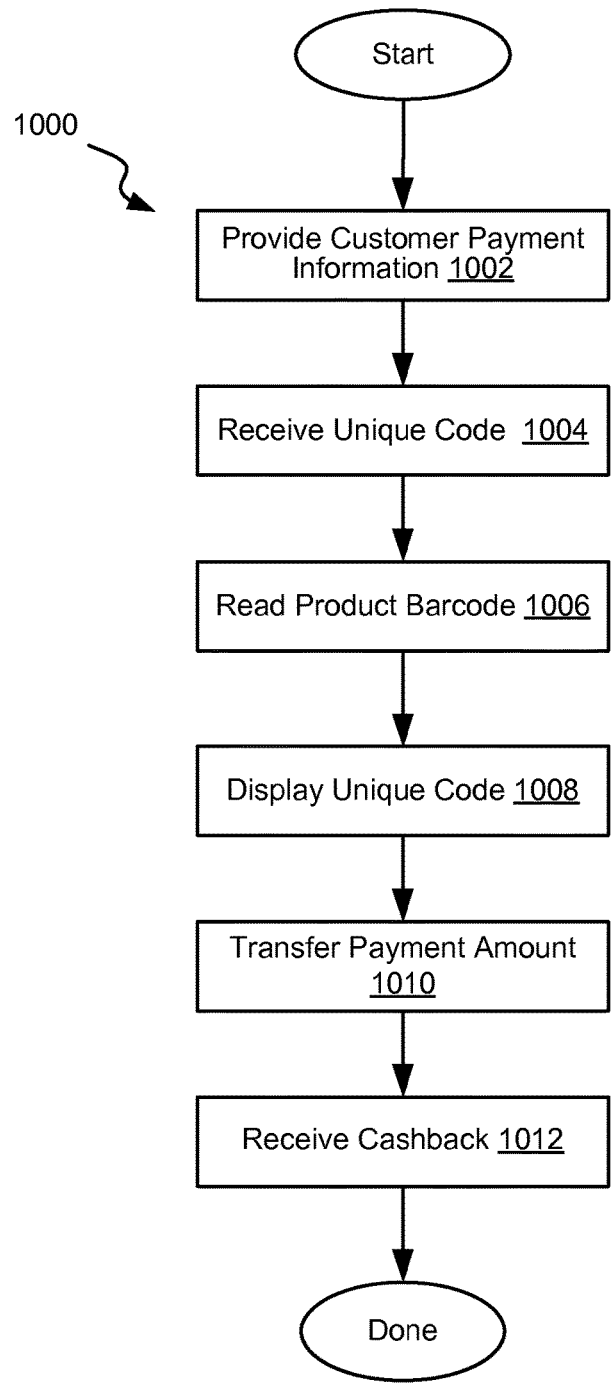
FIG. 10 is a block diagram illustrating a haptic control, in accordance with certain embodiments.

FIG. 10 is a block diagram 1000 illustrating a haptic control, in accordance with certain embodiments. The haptic control 1014 may be shown on the display 1010 of the mobile and wearable device 1012. The haptic control may include one or more mode selection elements. The mode selection elements may include a messaging mode 1002, a calling mode 1004, and a payment mode 1006. A user 1008 may give a haptic command (e.g. touch) to select a desired mode. If the user select the payment mode 1006, a transaction request may be generated.

The transaction request may be generated using data of a mobile application or a page from which the payment mode is activated. For example, the user may activate the payment mode from a purchase page of an online store. The payment may be immediately initiated without requesting further details. Data of a payment recipient and a payment amount may be received from the actual page or application and financial information of the user may be stored in the database of the mobile payment service. The user financial information may be provided by the user during registration with the mobile payment service 800 and may include one or more of the following: bank account information, credit card information, debit card information, gift card information, prepaid card information, insurance account information, merchant account information, mobile currency information, digital money, and so forth. Online payments can be secured by two-factor authorization. One of the factors may be authorization on the integrated interface initiation, and the other factor may include locating the mobile and wearable device associated with the user and comparing the location with the location where the payment is requested.

Alternatively, the transaction request may be generated using data of a page associated with billing. In that case, the mobile payment service 800 may generate a payment request using information extracted from the page as well as the financial information of the user stored in the mobile payment service 800.

Transactions can be associated with transactional payments based on Unstructured Supplementary Service Data (USSD) or Short Message Service (SMS), direct operator billing, credit card mobile payments, online wallets, QR code payments, contactless NFC, cloud-based mobile payments, audio signal-based payment, Bluetooth Low Energy (BLE) signal beacon payment, in-application payment, SDK payment, API payment, social networking payment, and direct carrier/bank co-operation.

Contactless NFC may be used to receive data for the payment request. For example, when the one touch and one-scan payment mode is selected, the user may make a payment for purchases in physical stores or transportation services. The mobile and wearable device may be equipped with a smart card. When a user waves the mobile and wearable device near a radar module, a payment is made. In some cases, the payment may require authentication. The NFC payment could be deducted from a pre-paid account or changed to a mobile or band account directly. NFC payment may include displaying a barcode on the mobile device screen for mobile payment. The payment barcode can include one or more of the following: a linear barcode, a two-dimensional barcode, a three-dimensional barcode, a machine readable code, and so forth.

The audio channel of the mobile phone may be another wireless interface that is used to receive data for a transaction request. Chip, ultra sound and acoustic features of the mobile and wearable device may support mobile payments. Near sound data transfer (NDST), data over voice and NFC produce audio signatures that the mobile phone can pick up to enable electronic transactions.

In some embodiments, the payment receiving transaction and the payment sending transaction are performed using a NFC. The NFC may be used to pair the mobile and wearable device and a merchant device by bringing the mobile and wearable device into proximity to the merchant device. The mobile and wearable device and the merchant device may be connected to a cloud network. The financial data and authorizing data associated with the user may be stored in the cloud network. In an example embodiment, upon pairing the mobile and wearable device with the merchant device, a Bluetooth connection between the mobile and wearable device and the merchant device may be established. The payment receiving transaction and the payment sending transaction may include at least a pear-to-pear transaction.

In some embodiments, a beacon mobile payment sends out a Bluetooth Low Energy (BLE) signal to anyone or any device with mobile application to transfer payment data and get electronic receipt. When a customer checks in, their picture and name may pop up on the retailer's point-of-sale system, when a sales associate at the store totals a bill on a cash register or a card-reading terminal, the beacon mobile payment user gives verbal confirmation to the associate, who matches the customer with the picture on the POS screen and concludes the transaction.

Figure 11:
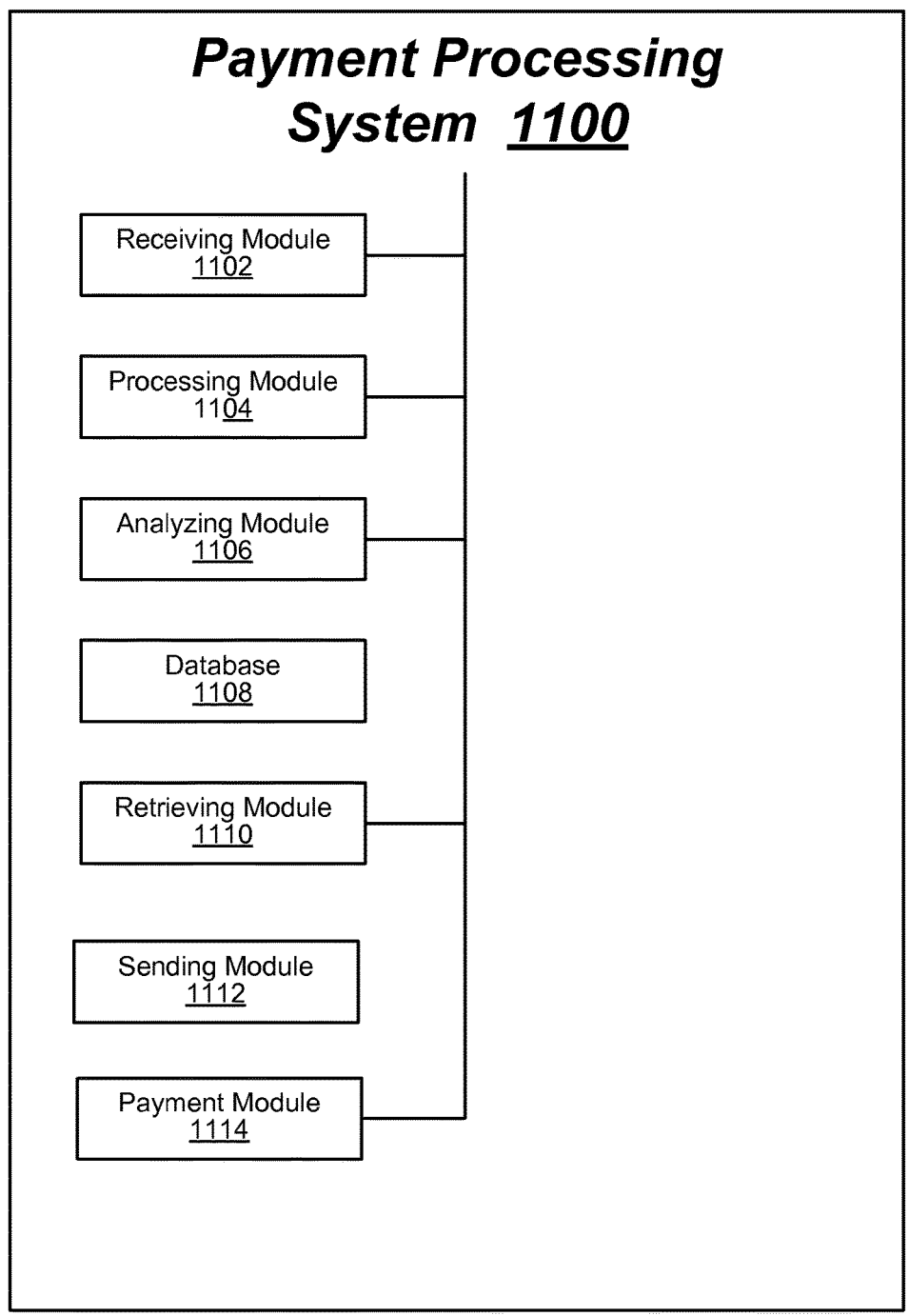
FIG. 11 is a block diagram illustrating a one-touch and one-scan payment and buying operation using the mobile payment service, in accordance with certain embodiments.

FIG. 11 is a block diagram illustrating a one-touch payment operation 1100 using the mobile payment service 800, in accordance with certain embodiments. The user selects a payment mode 1104 using a one-touch button 1102 (i.e. haptic control). The user selection may be transmitted to the mobile payment service 800, and the mobile payment service 800 may determine information on a page 1106 in view on the display. The mobile payment service 800 may automatically provide financial information of the user on the page 1106 and automatically initiate a payment.

Figure 12:
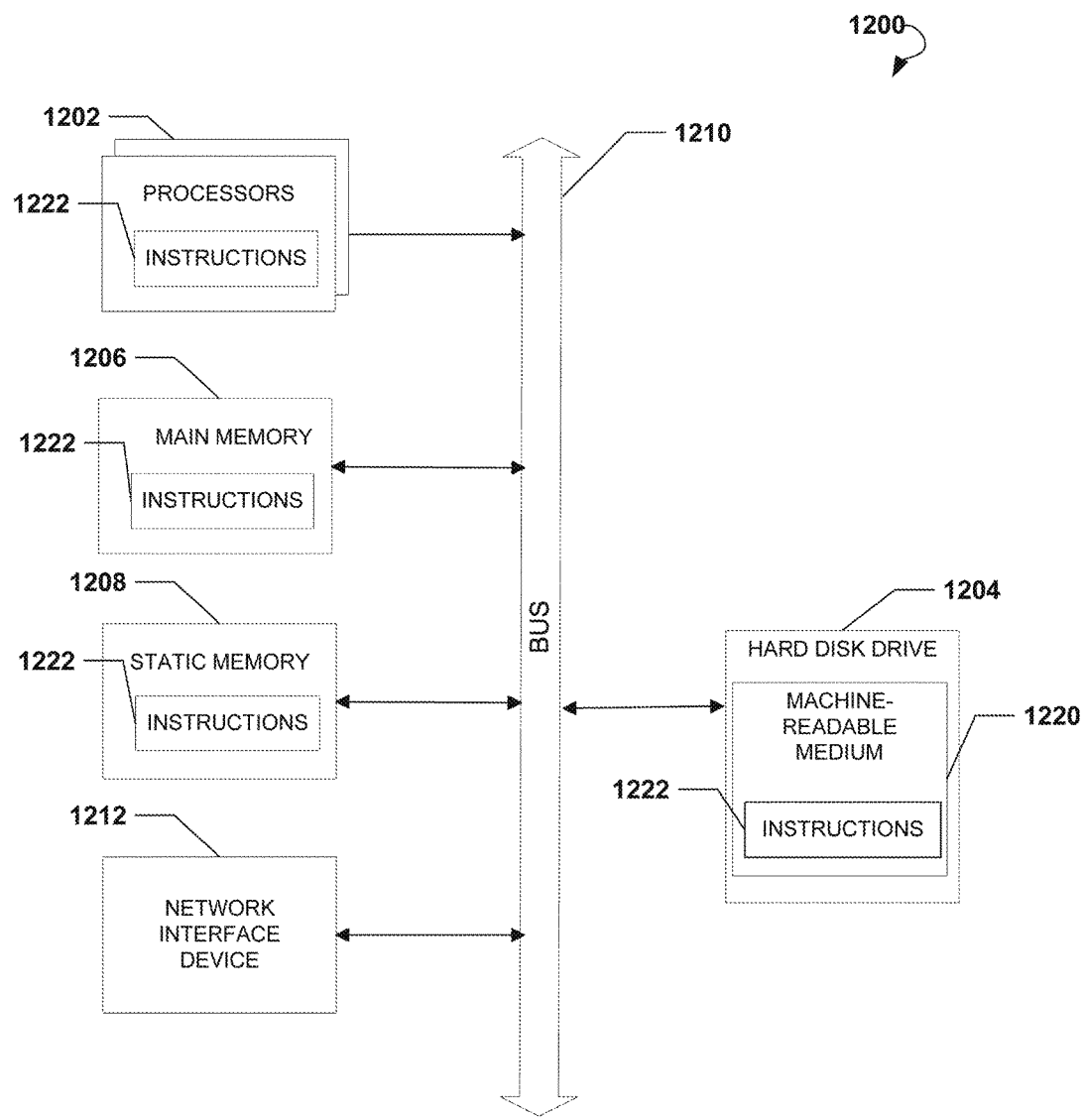
FIG. 12 shows a diagrammatic representation of a computing device for a machine in the exemplary electronic form of a computer system, within which a set of instructions for causing the machine to perform any one or more of the methodologies discussed herein, can be executed.

FIG. 12 shows a diagrammatic representation of a computing device for a machine in the exemplary electronic form of a computer system 1200, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box (STB), a cellular telephone, a digital camera, a portable music player (e.g., a portable hard drive audio device, such as an Moving Picture Experts Group Audio Layer 3 (MP3) player), a web appliance, a network router, a switch, abridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor or multiple processors 1202, a hard disk drive 1204, a main memory 1206 and a static memory 1208, which communicate with each other via a bus 1210. The computer system 1200 may also include a network interface device 1212. The hard disk drive 1204 may include a computer-readable medium 1220, which stores one or more sets of instructions 1222 embodying or utilized by any one or more of the methodologies or functions described herein. The instructions 1222 can also reside, completely or at least partially, within the main memory 1206 and/or within the processors 1202 during execution thereof by the computer system 1200. The main memory 1206 and the processors 1202 also constitute machine-readable media.

While the computer-readable medium 1220 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, C++, C# or other compilers, assemblers, interpreters or other computer languages or platforms.

Thus, various systems and methods for providing compensation for using a mobile payment service have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for using a mobile and wearable payment device and for providing compensation for using a mobile payment service, the method comprising: purchasing, for a price, using the mobile payment service, a mobile and wearable payment device operable to use the mobile payment service; receiving, by a processor of the mobile payment service, payment information associated with the purchase of the mobile and wearable payment device made via the mobile payment service, the payment information being associated with a mobile payment account of a user in the mobile payment service who purchased the mobile and wearable payment device and wherein the payment information comprises at least financial account information of the user operable to complete a purchase transaction via the mobile payment service; subsequent to the receiving of the payment information, receiving, by the processor of the mobile payment service, a deposit amount associated with the mobile and wearable payment device purchased by the user, the deposit amount equal to the price of the mobile and wearable payment device purchase; subsequent to the receiving of the deposit amount, generating, by the processor of the mobile payment service, a unique optical code, the unique optical code encoding the payment information; performing, by the mobile and wearable payment device, a subsequent product purchase by the user from a merchant, via the mobile payment service, the subsequent product purchase providing, by a processor of the mobile and wearable payment device, the unique optical code and a product barcode obtained by the mobile and wearable payment device from the product, to a display of the mobile device; displaying, by the display of the mobile and wearable payment device, the unique optical code and the product barcode; completing the subsequent product purchase by the merchant scanning the unique optical code and product barcode from the display of the mobile and wearable payment device; providing by the merchant, to the processor of the mobile payment service, the unique optical code and the product barcode; providing, from the deposit amount, at least one of a compensation, a rebate, a cashback, and a reward to the mobile payment account of the user, the at least one of the compensation, the rebate, the cashback, and the reward being a predetermined percentage of a total cost for the subsequent product purchase; providing the at least one of the compensation, the rebate, the cashback, and the reward from the deposit amount to the mobile payment account of the user for each purchase of a product made using at least the unique optical code and the mobile payment service, subsequent to the subsequent product purchase, and wherein a total amount of the at least one of the compensation, the rebate, the cashback, and the reward provided from the deposit amount for the subsequent product purchase and the product purchases made subsequently do not exceed the price of the mobile and wearable payment device, and can only be applied to payment of the mobile payment service. receiving, by the processor, a first user input; based on the first user input, initiating one or more sensors to capture multimedia to obtain captured multimedia; receiving, by the processor, a second user input; analyzing, by the processor, data associated with the first user input and the second user input, wherein the analyzing includes determining time between the first user input and the second user input; based on the analysis, selectively selecting, by the processor, a multimedia capture mode or a payment transaction mode; if the multimedia capture mode is selected, recording, by the processor, the captured multimedia to a database to obtain recorded multimedia, wherein a type of the multimedia being recorded is determined based on the time between the first user input and the second user input; if the payment transaction mode is selected, receiving, by the processor, transaction data, wherein the transaction data includes at least a payment amount and a recipient; based on the transaction data, user payment data, and recipient payment data, performing, by the processor, a payment transaction, wherein the user payment data, the deposit amount, and the recipient payment data are stored in the database; wherein the first user input and the second user input are performed on the mobile and wearable payment device, the mobile and wearable payment device including one or more of the following: handheld computing device, a smartphone, a tablet computer, a personal digital assistant, a e-textile item, an activity tracker, a smartwatch, smartglasses, a Global Positioning System watch, a mixed reality device, a computer-mediated reality device, and a clothing technology device, the mobile device having a band adapted to secure the mobile device on a human body, the human body including one or more of the following: a wrist, an arm, a neck, a head, a leg, a waist, an ear, and a finger, wherein the band is adapted to secure the mobile device under, within, or on clothing, and wherein the payment transaction mode is operable to process the product purchase and subsequent product purchases.

2. The method of claim 1, further comprising: calculating the compensation based on a payment amount associated with the further purchase, wherein the calculation is performed according to predefined criteria.

3. The method of claim 1, further comprising scanning the unique code or the product barcode from a screen of the mobile and wearable payment device associated with the user, wherein the unique code includes one or more of the following: a Quick Response (QR) code, a linear code, and a two-dimensional code.

4. The method of claim 1, wherein payment information includes one or more of the following: bank account information, credit card information, debit card information, gift card information, currency token information, and digital money information;

wherein the mobile payment service is provided by a service provider, and wherein the mobile payment service provides making payments using a provider terminals or a compatible device, wherein the compatible device works with a Pay Wave application associated with Visa, Pay Pass application associated with MasterCard, and Express Pay terminals associated with American Express, wherein the mobile payment service is associated with making payments at contactless points of sale and in application associated with iOS operating system or Android operating system; wherein the mobile payment service is associated with a two-factor authentication using a Near Field Communication (NFC) antenna and a chip that stores the payment information, the payment information being encrypted, the mobile payment service is operable to generate a dynamic security code for each transaction;

wherein the mobile payment service is operable to link a payment card associated with the user to the mobile payment service, the payment card being added by one or more of the following: indicating a user bank account by the user, taking a photo of the payment card, and entering the payment card information manually by the user.

5. The method of claim 1, wherein the deposit amount equals a price of the purchase.

6. The method of claim 1, further comprising:
based on the providing of the compensation, deducting the compensation from the deposit amount, wherein the compensation is provided to the user until the deposit amount exhausts.

7. The method of claim 1, further comprising:
providing, by the processor of the mobile and wearable payment device, a haptic control integrated with at least one mobile application associated with the mobile and wearable payment device, wherein the haptic control is shown on a display of the mobile and wearable payment device overlapping other visual elements, the haptic control providing mode selection elements associated with a payment mode, a messaging mode, and a calling mode;
receiving, by the processor, a selection of the payment mode via the mode selection elements of the haptic control from the user;
upon the selection, extracting, by the processor, context from the display of the mobile and wearable device, wherein the context includes a web page, an application screen, or a message in view on the display;
based on the context, determining, by the processor, a payment transaction type which the user intends to perform, wherein the payment transaction type includes a payment receiving transaction and a payment sending transaction, the determining including parsing of the context extracted from the display; and
based on the determining, automatically sending a transaction request to a financial institution without requesting financial information, authorizing, or confirmations, the financial data and authorizing data associated with the user being provided by the user during registration and stored in the mobile payment service, wherein the financial information includes one or more of the following: bank account information, credit card information, debit card information, gift card information, prepaid card information, insurance account information, merchant account information, mobile currency information, and digital money.

8. The method of claim 7, further comprising:
receiving, by the processor, a selection of the messaging mode via the mode selection elements of the haptic control from the user;
upon the selection, providing, by the processor, a messaging interface on the display of the mobile and wearable device;
receiving, by the processor, via the messaging interface, a message and a choice of a recipient from the user; and
sending, by the processor, the message to the recipient via a data network.

9. The method of claim 7, further comprising:
receiving, by the processor, a selection of the calling mode via the mode selection elements of the haptic control from the user;
upon the selection, providing, by the processor, a calling interface on the display of the mobile and wearable device; and
receiving, by the processor, via the calling interface, a call recipient from the user; and
performing, by the processor, the call with the call recipient via a data network, wherein the call is selected from a group comprising: an audio call, a video call, and a holographic video call, and wherein the call is performed via a Voice over Internet Protocol (VoIP) service, the VoIP service being provided via Wi-Fi, 3G network, 4G network, 5G network, 6G network or upper.

10. The method of claim 1, further comprising:
summarizing, by the processor, the one or more compensations to obtain a summarized compensation;
determining, by the processor, that the summarized compensation is equal to the deposit amount; and
based on the determining, providing a free product or a free service to the user.

11. The method of claim 1, wherein the compensation includes one or more of the following: loyalty credits provided for participation in loyalty programs, a repayment of a percentage of an amount of purchases made with a provider of the mobile payment service, a refund of bank services, a discount on mobile services, free mobile services, zero monthly fee, free bank services, free insurance services, and saved payment card charges.

12. The method of claim 1, wherein the free product is provided by a mobile payment service provider.

13. The method of claim 1, wherein payment information includes one or more of the following: bank account information, credit card information, debit card information, gift card information, and digital money information, wherein the payment information is associated with a payment transaction, wherein the payment transaction includes one or more of the following: a face-to-face barcode scanning payment transaction, a short distance Bluetooth payment transaction, a remote long distance Internet payment transaction, wherein the payment transaction is associated with one or more of the following: Unstructured Supplementary Service Data, Short Message Service, direct operator billing, a credit card mobile payment, an online wallet, a QR code payment, a contactless near field communication payment, a cloud-based mobile payment, an one-touch payment, an one-scan payment, an audio signal-based payment, a Bluetooth Low Energy signal beacon payment, an in-application payment, a social networking payment, a trade token payment, a merchant token payment, a currency token payment, and a direct carrier and bank co-operation;
wherein the payment transaction is associated with a third party application, wherein the payment transaction is associated with one or more of an application programming interface and a software development kit, wherein the payment transaction is further associated with a fingerprint touch recognition payment, a fingerprint press recognition payment, a gesture mark payment, a voice command payment, and eye blink payment, a fingerprint swipe recognition payment, and a nod payment;

wherein the payment transaction is associated with an NFC, the payment transaction being performed for purchases online and offline, wherein a payment associated with the payment transaction is transferred from a pre-paid account of the user or charged to a mobile account of the user or a bank account of the user; wherein the payment includes at least a one-touch and one-scan payment for street parking in demarcated areas, the payment being performed using one or more of the following: a license plate, transponder tags, barcode stickers, and reading the code from the display; wherein a merchant uses a combination of the NFC and the code on the display for performing the one-touch and one-scan payment; wherein the NFC is used to establish radio communication with an external device by touching the housing and the external device or bringing the housing and the external device into proximity, the proximity includes a distance of up to 10 centimeters; wherein the payment transaction is performed a mode selected from three modes, the three modes include an NFC target mode when the mobile device is acting as a credential, a NFC initiator mode when the mobile device is acting as a reader, and an NFC peer-to-peer mode; wherein the payment is further associated with advertisement tags, two-dimensional barcodes, and ultra high frequency tags; wherein user credentials are provisioned over the air; the payment being associated with a payment application operable to control transferring of the payment and access payment readers.

14. The method of claim 1, wherein the purchase includes a product, a device, a detail part, and a service provided to the user.

15. The method of claim 1, wherein the deposit amount equals a price of the purchase.

16. The method of claim 1, wherein a cost of the free product or the free service equals to the deposit amount.

17. A system for using a mobile and wearable payment device and for providing compensation for using a mobile payment service, the system comprising:

a processor configured to:
receive payment information associated with a user purchase, for a price, of a mobile and wearable payment device operable to use the mobile payment service, made via the mobile payment service, the payment information being associated with a mobile payment account of the user in the mobile payment service, wherein the payment information is associated with a mobile payment account of the user in the mobile payment service who purchased the mobile and wearable payment device and wherein the payment information comprises at least financial account information of the user operable to complete a purchase transaction via the mobile payment service; subsequent to the receiving of the payment information, receive a deposit amount associated with the purchase of the mobile and wearable payment device, the deposit amount equal to the price of the mobile and wearable payment device; subsequent to the receiving of the deposit amount, generate a unique code, the unique code encoding the payment information;
provide the unique code to the user;
receive a notification about a further product purchase of the user made on the mobile and wearable payment device via the mobile payment service at a merchant selling the product, the notification including at least the unique code and a product barcode obtained from the product by the mobile and wearable payment device, the product barcode being associated with the further purchase; receive, from the merchant, the unique optical code and the product barcode obtained by the merchant from the display of the mobile and wearable payment device;
provide at least one of a compensation, a rebate, a cashback, and a reward from the deposit amount to the mobile payment account of the user, the at least one of the compensation, the rebate, the cashback, and the reward being associated with a payment amount associated with the further purchase, wherein the at least one of the compensation, the rebate, the cashback, and the reward amounts to a predetermined percent of a total cost of the further product purchase; provide the at least one of the compensation, the rebate, the cashback, and the reward from the deposit amount to the mobile payment account of the user for each purchase of a product made using at least the unique optical code and the mobile payment service, subsequent to the further product purchase, and wherein a total amount of the at least one of the compensation, the rebate, the cashback, and the reward provided from the deposit amount for the further product purchase and the product purchases made subsequently do not exceed the price of the mobile and wearable device, and can only be applied to payment of the mobile payment service; and wherein the processor is further configured to receive, a first user input; based on the first user input, initiate one or more sensors to capture multimedia to obtain captured multimedia; receive a second user input; analyze data associated with the first user input and the second user input, wherein the analyzing includes determining time between the first user input and the second user input; based on the analysis, selectively select, a multimedia capture mode or a payment transaction mode; if the multimedia capture mode is selected, record the captured multimedia to a database to obtain recorded multimedia, wherein a type of the multimedia being recorded is determined based on the time between the first user input and the second user input; if the payment transaction mode is selected, receive transaction data, wherein the transaction data includes at least a payment amount and a recipient; based on the transaction data, user payment data, and recipient payment data, perform a payment transaction, wherein the user payment data, the deposit amount, and the recipient payment data are stored in the database; wherein the first user input and the second user input are performed on the mobile and wearable payment device, the mobile and wearable payment device including one or more of the following: handheld computing device, a smartphone, a tablet computer, a personal digital assistant, a e-textile item, an activity tracker, a smartwatch, smartglasses, a Global Positioning System watch, a mixed reality device, a computer-mediated reality device, and a clothing technology device, the mobile device having a band adapted to secure the mobile device on a human body, the human body including one or more of the following: a wrist, an arm, a neck, a head, a leg, a waist, an ear, and a finger, wherein the band is adapted to secure the mobile device under, within, or on clothing, and wherein the processor in the payment transaction mode is operable to process the product purchase and subsequent product purchases.

18. The system of claim 17, further comprising a user interface configured to visualize data associated with the mobile payment service.

19. The system of claim 17, wherein the processor is further configured to:
 deduct the compensation from the deposit amount based on the providing of the compensation, the compensation being provided to the user until the deposit amount exhausts; and
 calculate the compensation based on the notification, wherein the calculation is performed according to predefined criteria.

\* \* \* \* \*